(12) United States Patent
Allen-Ware et al.

(10) Patent No.: US 9,141,159 B2
(45) Date of Patent: Sep. 22, 2015

(54) MINIMIZING AGGREGATE COOLING AND LEAKAGE POWER WITH FAST CONVERGENCE

(75) Inventors: Malcolm S. Allen-Ware, Austin, TX (US); John B. Carter, Austin, TX (US); Wei Huang, Austin, TX (US); Charles R. Lefurgy, Austin, TX (US); Guillermo J. Silva, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 13/288,346

(22) Filed: Nov. 3, 2011

(65) Prior Publication Data

US 2013/0116963 A1   May 9, 2013

(51) Int. Cl.
```
G01R 21/00     (2006.01)
G01K 17/00     (2006.01)
G06F 1/20      (2006.01)
G06F 1/32      (2006.01)
```

(52) U.S. Cl.
CPC .............. *G06F 1/206* (2013.01); *G06F 1/3203* (2013.01); *Y02B 60/1275* (2013.01)

(58) Field of Classification Search
CPC .............................. G06F 1/3203; G06F 1/206
USPC ................................................. 702/60, 136
See application file for complete search history.

(56) References Cited

U.S. PATENT DOCUMENTS

| | | | |
|---|---|---|---|
| 3,750,004 A | 7/1973 | Walker | |
| 4,127,885 A | 11/1978 | Adam et al. | |
| 4,835,649 A | 5/1989 | Salerno | |
| 5,268,631 A | 12/1993 | Gorman et al. | |
| 5,581,475 A | 12/1996 | Majors | |
| 6,163,712 A | 12/2000 | Winkler et al. | |
| 6,390,379 B1 * | 5/2002 | Huang | 236/49.3 |
| 6,532,570 B1 | 3/2003 | Mau | |

(Continued)

FOREIGN PATENT DOCUMENTS

| | | |
|---|---|---|
| JP | 10-066359 | 3/1998 |
| JP | 2001-238434 | 8/2001 |
| WO | WO2005/017468 A2 | 2/2005 |

OTHER PUBLICATIONS

Interview Summary mailed Sep. 5, 2013 from the USPTO for U.S. Appl. No. 13/079,842; 3 pages.

(Continued)

*Primary Examiner* — Sujoy Kundu
*Assistant Examiner* — Ricky Ngon
(74) *Attorney, Agent, or Firm* — Francis Lammes; Stephen J. Walder, Jr.; William J. Stock

(57) ABSTRACT

A mechanism is provided for minimizing system power in the data processing system with fast convergence. A current aggregate system power value is determined using a current thermal threshold value. For each potential thermal threshold value in a set of potential thermal threshold values, a determination is made as to whether there is a potential thermal threshold value that results in a potential aggregate system power value that is lower than the current aggregate system power value. Responsive to identifying an optimal potential thermal threshold value from the set of potential thermal threshold values that results in minimum aggregate system power value that is lower than the current aggregate system power value, the optimal potential thermal threshold value is set as a new thermal threshold value.

12 Claims, 8 Drawing Sheets

(56) References Cited

U.S. PATENT DOCUMENTS

| | | | |
|---|---|---|---|
| 6,643,128 B2 | 11/2003 | Chu et al. | |
| 6,836,100 B2 | 12/2004 | Egan et al. | |
| 6,959,258 B2 * | 10/2005 | Smith et al. | 702/132 |
| 7,000,204 B2 | 2/2006 | McGuffin et al. | |
| 7,050,871 B2 | 5/2006 | Bartley et al. | |
| 7,131,096 B1 | 10/2006 | Balsdon et al. | |
| 7,167,015 B2 | 1/2007 | Borkar | |
| 7,203,629 B2 | 4/2007 | Ozis et al. | |
| 7,257,796 B2 | 8/2007 | Miller et al. | |
| 7,281,140 B2 | 10/2007 | Burns et al. | |
| 7,321,942 B2 | 1/2008 | Flautner et al. | |
| 7,370,303 B2 | 5/2008 | Einspenner et al. | |
| 7,424,806 B2 * | 9/2008 | Tien et al. | 62/178 |
| 7,430,672 B2 | 9/2008 | Rotem et al. | |
| 7,447,602 B1 | 11/2008 | Bradley et al. | |
| 7,487,371 B2 * | 2/2009 | Simeral et al. | 713/300 |
| 7,495,519 B2 | 2/2009 | Kim et al. | |
| 7,530,040 B1 | 5/2009 | Balsdon et al. | |
| 7,533,003 B2 | 5/2009 | Floyd et al. | |
| 7,644,051 B1 | 1/2010 | Moore et al. | |
| 7,659,622 B2 | 2/2010 | Dauksher et al. | |
| 7,689,839 B2 | 3/2010 | Uguen et al. | |
| 7,710,131 B1 | 5/2010 | Tiernan | |
| 7,719,302 B2 | 5/2010 | Hsu et al. | |
| 7,721,245 B2 | 5/2010 | Maziasz et al. | |
| 7,784,010 B1 | 8/2010 | Balsdon et al. | |
| 7,793,239 B2 | 9/2010 | Engel et al. | |
| 7,797,654 B2 | 9/2010 | Tai et al. | |
| 7,805,689 B2 | 9/2010 | Ueda et al. | |
| 7,840,825 B2 | 11/2010 | Altevogt et al. | |
| 7,904,287 B2 | 3/2011 | Lefurgy et al. | |
| 7,917,772 B1 | 3/2011 | Koniaris et al. | |
| 7,941,779 B2 | 5/2011 | Rahmat et al. | |
| 7,971,073 B2 | 6/2011 | Hsu et al. | |
| 8,041,521 B2 | 10/2011 | Bletsch et al. | |
| 8,053,748 B2 | 11/2011 | Shah et al. | |
| 8,086,978 B2 | 12/2011 | Zhang et al. | |
| 8,089,743 B2 | 1/2012 | Jian | |
| 8,127,157 B2 | 2/2012 | Bilak | |
| 8,181,147 B2 | 5/2012 | Tang et al. | |
| 8,201,038 B2 | 6/2012 | Graas et al. | |
| 8,214,663 B2 | 7/2012 | Floyd et al. | |
| 8,260,708 B2 | 9/2012 | Potkonjak | |
| 8,266,569 B2 | 9/2012 | Palisetti et al. | |
| 8,332,074 B2 * | 12/2012 | Lee | 700/276 |
| 8,412,479 B2 | 4/2013 | David et al. | |
| 8,532,826 B2 * | 9/2013 | Moss et al. | 700/276 |
| 8,543,843 B1 | 9/2013 | Cheng et al. | |
| 8,671,290 B2 * | 3/2014 | Hsu | 713/300 |
| 2002/0019870 A1 | 2/2002 | Chirashnya et al. | |
| 2004/0078634 A1 | 4/2004 | Gilstrap et al. | |
| 2004/0206101 A1 | 10/2004 | Bash et al. | |
| 2004/0236560 A1 | 11/2004 | Chen | |
| 2005/0085960 A1 | 4/2005 | Lumbis et al. | |
| 2005/0273208 A1 | 12/2005 | Yazawa et al. | |
| 2006/0052970 A1 | 3/2006 | Arabi et al. | |
| 2006/0090086 A1 | 4/2006 | Rotem et al. | |
| 2006/0168571 A1 | 7/2006 | Ghiasi et al. | |
| 2006/0178764 A1 | 8/2006 | Bieswanger et al. | |
| 2007/0088974 A1 | 4/2007 | Chandwani et al. | |
| 2008/0086708 A1 | 4/2008 | Rittman | |
| 2008/0140362 A1 | 6/2008 | Gross et al. | |
| 2008/0234953 A1 | 9/2008 | Ignowski et al. | |
| 2008/0278905 A1 | 11/2008 | Artman et al. | |
| 2009/0076790 A1 | 3/2009 | Fein et al. | |
| 2009/0138219 A1 | 5/2009 | Bletsch et al. | |
| 2009/0259869 A1 | 10/2009 | Naffziger | |
| 2009/0296342 A1 | 12/2009 | Matteson et al. | |
| 2010/0049995 A1 | 2/2010 | Casey et al. | |
| 2010/0218029 A1 | 8/2010 | Floyd et al. | |
| 2010/0268930 A1 | 10/2010 | Bose et al. | |
| 2010/0268974 A1 | 10/2010 | Floyd et al. | |
| 2010/0268975 A1 | 10/2010 | Bose et al. | |
| 2011/0173581 A1 | 7/2011 | Koushanfer et al. | |
| 2011/0231030 A1 | 9/2011 | Carter et al. | |
| 2013/0305068 A1 | 11/2013 | Jung | |

OTHER PUBLICATIONS

Notice of Allowance mailed from the USPTO Sep. 12, 2013 for U.S. Appl. No. 13/079,842; 9 pages.

Office Action dated Jun. 25, 2013 for U.S. Appl. No. 13/079,842; 16 pages.

Response to Office Action dated Sep. 3, 2013, U.S. Appl. No. 13/079,842, 12 pages.

U.S. Appl. No. 12/726,792.

Economou, Dimitris et al., "Full-System Power Analysis and Modeling for Server Environments", Stanford University, Workshop on Modeling Benchmarking and Simulation, 2006, 8 pages.

Pakbaznia, Ehsan et al., "Minimizing Data Center Cooling and Server Power Costs", Proceedings of the 14th ACM/IEEE International Symposium on Low Power Electronics and Design, 2009, pp. 145-150.

Wang, Zhikui et al., "Optimal Fan Speed Control for Thermal Management of Servers", Proceedings of the ASME/Pacific Rim Technical Conference and Exhibition on Packaging and Integration of Electronic and Photonic Systems, MEMS, and NEMS InterPACK'09, San Francisco, California, Jul. 19-23, 2009, 11 pages.

U.S. Appl. No. 12/424,158.

U.S. Appl. No. 12/424,161.

U.S. Appl. No. 12/749,179.

"Use of Instrumented Activity Counts to Identify Relevant Code Points for Performance Analysis and Tuning", www.IP.com No. IPCOM000184039D, Jun. 9, 2009, 7 pages.

Joseph, Russ et al., "Run-time Power Estimation in High-Performance Microprocessors", Proceedings of the International Symposium on Low Power Electronics and Design (ISLPED), Aug. 6-7, 2002, 6 pages.

Zhang, Lide et al., "Process Variation Characterization of Chip-Level Multiprocessors", 2009 46th ACM/IEEE Design Automation Conference (DAC), 2009, pp. 694-697.

International Search Report and Written Opinion dated Jan. 25, 2013 for International Application No. PCT/US2012/062919, 12 pages.

Notice of Allowance mailed Feb. 7, 2013 for U.S. Appl. No. 12/726,792; 12 pages.

U.S. Appl. No. 13/608,285.

U.S. Appl. No. 14/039,047.

"Failure Mechanisms and Models for Semiconductor Devices", JEDEC Solid State Technology Association, JEP122G, Published Oct. 2011, Revision of JEP122F published Nov. 2010, 108 pages.

"Method to Estimate Power at Test Conditions", IPCOM000211219D ip.com, Sep. 28, 2011, 2 pages.

"Semiconductor Device Reliability Verification", Sony, Semiconductor Quality and Reliability Handbook, Chapter 2, http://www.sony.net/Proclucts/SC-HP/tec/catalog/pdf/chapter2e_201108.pdf, 2011, 32 pages.

Bickford, Jeanne P. et al., "In-Situ Computing System Failure Avoidance", U.S. Appl. No. 13/948,811, filed Jul. 23, 2013, 45 pages.

Black, James R., "Mass Transport of Aluminum by Momentum Exchange with Conducting Electrons", IEEE 05CH37616 43rd Annual International Reliablility Physics Symposium, San Jose, California, 2005, reprinted from 6th Annual Reliability Physics Proceedings, Los Angeles, California, Nov. 6-8, 1967, 6 pages.

Blish, Richard et al., "Semiconductor Device Reliablity Failure Models", International SEMATECH, Technology Transfer # 0053955A-XFR, May 31, 2000, 34 pages.

Covi, Kevin R. et al., "Implementing Dynamic Regulator Output Current Limiting", U.S. Appl. No. 13/764,858, filed Feb. 12, 2013, 22 pages.

Geiger, Randall L. et al., "Lifetime Electrothermal Stress Management for Multi-Core Systems", Iowa State University, Annual Review, http://www.src.org/library/publication/p056624/, Received Jun. 18, 2010, Last Edited Jun. 21, 2010, retrieved from the Internet Nov. 15, 2013, 68 pages.

(56) References Cited

OTHER PUBLICATIONS

Haberland, Julian et al., "Current Loadability of ICA for Flip Chip Applications", 4th Electronics Packaging Technology Conference, 2002, 6 pages.
Huang, Wei et al., "Accurate Fine-Grained Processor Power Proxies", MICRO-45, Dec. 2012, 11 pages.
Hutcheon, Graeme A. et al., "Remote Electromigration Monitoring of Electronic Chips", U.S. Appl. No. 13/804,657, filed Mar. 14, 2013, 24 pages.
Libby, Richard, "Effective HPC hardware management and Failure prediction strategy using IPMI", Proceedings of the Linux Symposium, 2003, 12 pages.
Logan, Sheldon et al., "Package-Chip Co-Design to Increase Flip-Chip C4 Reliability", 12th International Symposium on Quality Electronic Design, 2011, pp. 553-558.
Loughmiller, Daniel R., "Quality and Reliability of Semiconductor Devices", Micron Group, Inc., http://www.ee.uidaho.edu/ee/classes/ee481f01/Micronrelib.pdf, retrieved Jan. 9, 2014, 19 pages.
Master, Raj N. et al., "Electromigration of C4 bumps in Ceramic and Organic Flip-Chip Packages", 2006 Electronic Components and Technology Conference, IEEE, 2006, pp. 646-649.
Nagaraj, Vishal, "Flip Chip Back End Design Parameters to Reduce Bump Electromigration", The University of Texas at Arlington, Aug. 2008, 60 pages.
Peng, Chin-Yang et al., "Simultaneous Block and I/O Buffer Floorplanning for Flip-Chip Design", Asia and South Pacific Conference in Design Automation, IEEE, Jan. 2006, pp. 213-218.
Todri, Aida et al., "Power Supply Noise Aware Workload Assignment for Multi-Core Systems", IEEE/ACM International Conference on Computer-Aided Design, 2008, 8 pages.
Vigrass, William J., "Calculation of Semiconductor Failure Rates", http://www.intersil.com/content/dam/Intersil/quality/rel/calculation_of_semiconductor_failure_rates.pdf, retrieved Jan. 9, 2014, 5 pages.
Wang, Xiaorui et al., "Adaptive Power Control with Online Model Estimation for Chip Multiprocessors", IEEE Transactions on Parallel and Distributed Systems, v. 22, No. 10, Oct. 2011, 15 pages.
Office Action mailed Jun. 20, 2012 for U.S. Appl. No. 12/726,792; 9 pages.
Response to Office Action filed Aug. 27, 2012, U.S. Appl. No. 12/726,792, 11 pages.
U.S. Appl. No. 13/079,842.
U.S. Appl. No. 13/488,822.
Jacobson, Hans et al., "Abstraction and Microarchitecture Scaling in Early-Stage Power Modeling", IEEE, 2011, pp. 394-405.
Lee, Seung Eun et al., "A variable frequency link for a power-aware network-on-chip (NoC)", Integration, The VLSI Journal, v. 42, Jan. 2009, pp. 479-485.
Powell, Michael D. et al., "CAMP: A Technique to Estimate Per-Structure Power at Run-time using a Few Simple Parameters", IEEE, 2008, pp. 289-300.
Shin, Donghwa et al., "Energy-Optimal Dynamic Thermal Management for Green Computing", ACM, ICCAD '09, Nov. 2-5, 2009, 6 pages.
Snowden, David, "Operating System Directed Power Management", Thesis, School of Computer Science and Engineering at The University of New South Wales, Mar. 4, 2010, 237 pages.

\* cited by examiner

MINIMIZING AGGREGATE COOLING AND LEAKAGE POWER WITH FAST CONVERGENCE

BACKGROUND

The present application relates generally to an improved data processing apparatus and method and more specifically to mechanisms for minimizing aggregate cooling and leakage power with fast convergence.

As computer and other electronic systems have increased performance over time, the power consumed to enable the performance has increased dramatically. Until recently, power management has mostly been an issue associated with the max temperatures components or subassemblies may experience. However, a system behavior that requires significant power during periods of high production, but requires very little power consumption during idle or low production periods, will tend to experience large variations in temperature depending upon the nature of the thermal cooling paths and the workload demands on the system. These temperature variations may cause failures due to mechanical stress and strain induced fatigue for structures that are composed of materials with varying coefficients of thermal expansion (CTE).

When a system is operating at a high temperature, more power is consumed, primarily due to increased thermally induced parasitic power, such as leakage power. In current systems, leakage power is controlled by setting a thermal threshold to approximately 70 degrees Celsius. When the temperature is exceeded, these systems turn to increasing fan speed, decreasing voltage, decreasing frequency, and/or decreasing workload, and when the temperature falls below the threshold, these systems decrease fan speed, increase voltage, increase frequency, and/or increasing workload. Such changes may lead to failures due to mechanical stress and strain induced fatigue for structures as previously described.

SUMMARY

In one illustrative embodiment, a method, in a data processing system, is provided for minimizing system power in the data processing system with fast convergence. The illustrative embodiment determines a current aggregate system power value using a current thermal threshold value. For each potential thermal threshold value in a set of potential thermal threshold values, the illustrative embodiment determines whether there is a potential thermal threshold value that results in a potential aggregate system power value that is lower than the current aggregate system power value. The illustrative embodiment sets the optimal potential thermal threshold value as a new thermal threshold value in response to identifying an optimal potential thermal threshold value from the set of potential thermal threshold values that results in minimum aggregate system power value that is lower than the current aggregate system power value.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for minimizing system power without performance penalty with fast convergence. The mechanism adjusts a fan speed based on a processor thermal set point from which system power is minimized without thermal violations using a model-based approach. Using models for processor power and revolutions per minute (RPM) required for a fan to reach a desired temperature, the mechanism determines an aggregate system power value $P_{total}$ of system power and cooling fan power for a predetermined time period. In order to reach a point where leakage power increase does not outrun fan power savings, then, during each time period, the mechanism determines whether a new thermal threshold for the system should be implemented based initially on the determined aggregate system power value $P_{total}$. If the mechanism determines a new thermal threshold that provides better overall power efficiency than a current thermal threshold, then the mechanism updates the thermal threshold. Further, if there is a new thermal threshold that reduces overall the aggregate system power, then the fan speed is adjusted accordingly based on the reduced aggregate system power value $P_{total}$. Thus, the illustrative embodiments minimize system power by exploiting that relationship between fan power and leakage power, and reach optimal aggregate system power faster.

Figure 1:
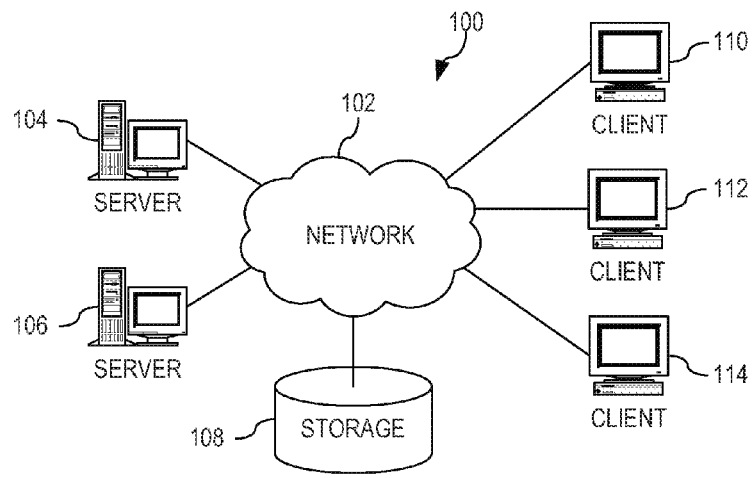
FIG. 1 depicts a pictorial representation of an example distributed data processing system in which aspects of the illustrative embodiments may be implemented.
Figure 2:
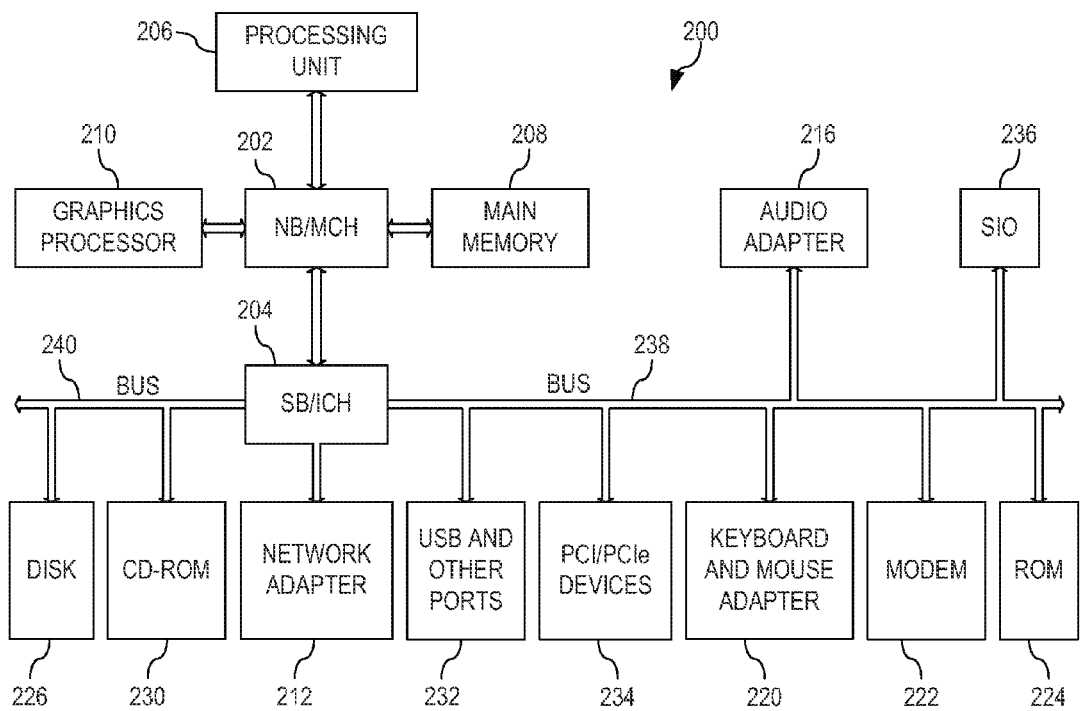
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that minimizes system power without performance penalty, this is only an example and is not intended to state or imply any limitation with regard to the features of the present invention. To the contrary, the illustrative embodiments are intended to include distributed data processing environments and embodiments in which system power may be minimized without performance penalty.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Again, the illustrative embodiments provide a mechanism for minimizing system power without performance penalty with fast convergence. The mechanism determines an aggregate system power $P_{total}$ of system power and cooling fan power for a predetermined time period using models for processor power and revolutions per minute (RPM) required for a fan to reach a desired temperature. During each time period, the mechanism determines whether a new thermal threshold for the system should be implemented based initially on the determined aggregate system power $P_{total}$ in order to reach a point where leakage power increase does not outrun fan power savings. If the mechanism determines a new thermal threshold that provides better overall power efficiency than a current thermal threshold, then the mechanism updates the thermal threshold and adjusts the fan speed accordingly.

Figure 3:
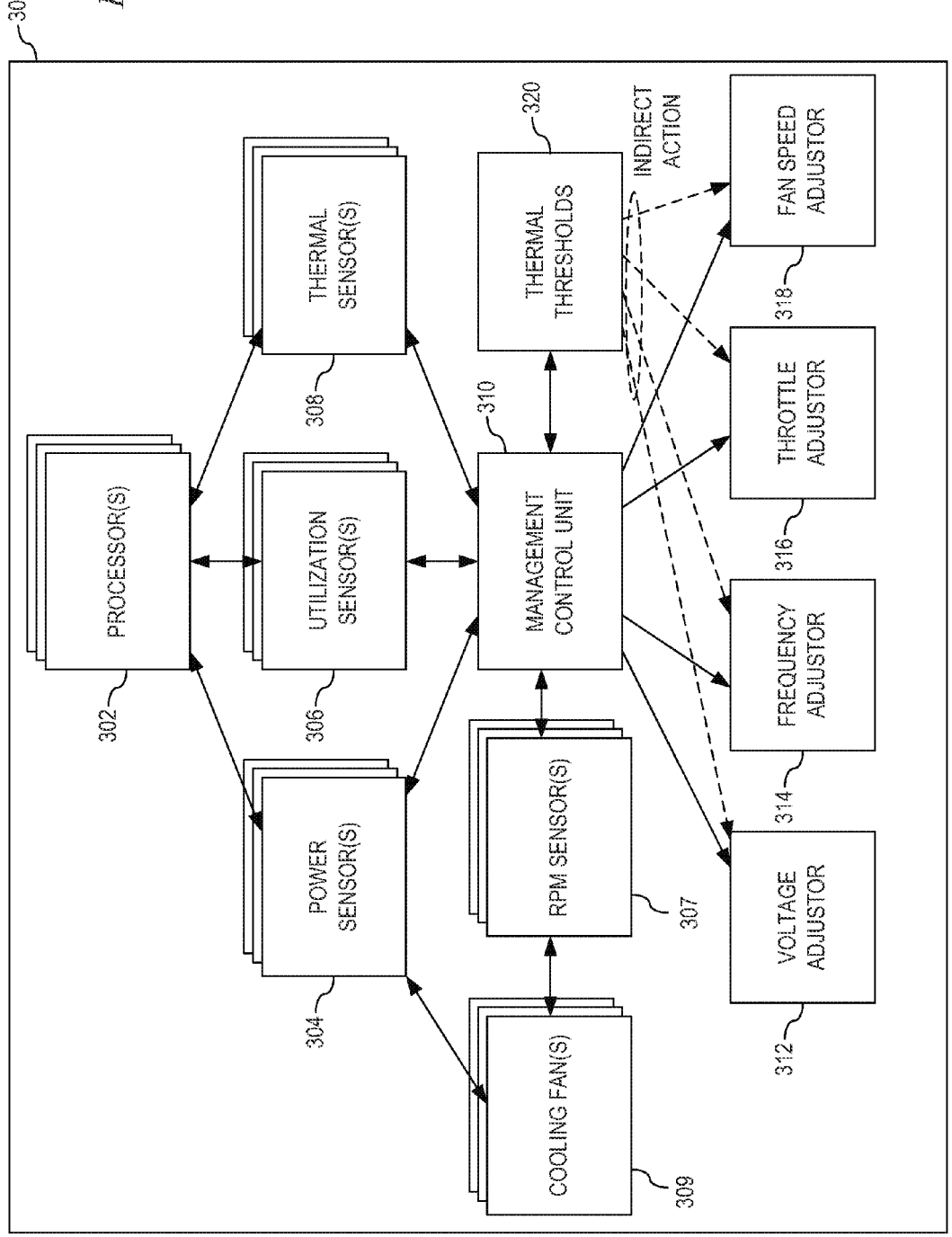
FIG. 3 depicts a functional block diagram of a mechanism that minimizes system power without performance penalty in accordance with an illustrative embodiment.

FIG. 3 depicts a functional block diagram of a mechanism that minimizes system power without performance penalty in accordance with an illustrative embodiment. Data processing system 300 may comprise one or more of processors 302 that have associated sensors, such as power sensors 304, utilization sensors 306, thermal sensors 308, revolutions per minute (RPM) sensors 307, or the like. Power sensors 304 monitor the power consumed by each of processors 302 and each of cooling fans 309 and send the detected system power usage values to management control unit 310. Likewise, utilization sensors 306 may monitor the workload performed by each of processors 302 and send detected utilization values to management control unit 310. Similarly, thermal sensors 308 may be positioned adjacent to areas within data processing system 300 that typically experience the greatest variance in temperature during the execution of most applications, such as adjacent to processor 302. Thermal sensors 308 monitor the temperature associated with these areas and send the detected temperature values to management control unit 310. Additionally, thermal sensors 308 may be directed to measuring both an ambient temperature of data processing system 300 as well as extreme localized temperature areas of data processing system 300, such as those used in the illustrative embodiments, which may comprise: adjacent to each processing unit, memory flow controller, disks, or the like. RPM sensors 307 may monitor the revolutions per minute (RPMs) of cooling fans 309 and send detected RPM values to management control unit 310.

Management control unit 310 may use the system power usage values, utilization values, temperature values, and RPM values to control (directly or indirectly) the voltage, frequency, workload, and/or cooling associated with each of processors 302 using mechanisms such as voltage adjustor 312, frequency adjuster 314, throttle adjustor 316, and fan speed adjustor 318, respectively. That is, the illustrative embodiments may indirectly control fan speed by adjusting one or more of thermal thresholds 320 or the illustrative embodiments may directly control fan speed through the use of signals direct to fan speed adjustor 318. Management control unit 310 may also use one or more thermal thresholds 320 to indirectly cause an adjustment in one or more of the voltage, frequency, workload, and cooling associated with each of processors 302 based on any one of the detected power usage values, utilization values, and temperature values.

At initialization of data processing system 300, management control unit 310 performs a calibration to obtain characteristic information for data processing system 300. That is, management control unit 310 initiates a constant and unvarying workload on processors 302 while keeping voltage and frequency levels steady. Management control unit 310 obtains a current total processor power value $P_{meas}$ for processors 302 via power sensors 304 in order to establish a characteristic processor power value $P_{proc\_char}$. Additionally, management control unit 310 obtains a set of temperature values $T_{meas}$ read from thermal sensors 308 for processors 302 as well as an ambient temperature value $T_{amb}$ for data processing system 300 in order to establish a characteristic temperature value $T_{thr\_char}$ for processors 302 and a characteristic ambient temperature value $T_{amb\_char}$ for data processing system 300. Further, management control unit 310 obtains current RPM values read from RPM sensors 307 for cooling fans 309 in order to establish a characteristic RPM value $RPM\_char$. Using this characteristic information, management control unit 310 is able to derive other characteristic information, such as a power leakage scaling factor $P_{leak\_per\_°C.}$ and a change in RPM as a function of temperature change $\Delta RPM/°C.$, and a fan power model that equates RPMs to measured power.

Management control unit 310 derives the power leakage scaling factor $P_{leak\_per\_°C.}$ by, under the constant workload on processors 302, setting a current thermal threshold value $T_{thr\_c}$ from thermal thresholds 320 to a low end of a range of potential thermal threshold values $T_{thr}$, for example, for a range of 65° C. to 80° C., management control unit 310 would initially set $T_{thr}$ to 65° C. thereby forming $T_{thr1}$. Data processing system 300 then processes the current workload until the temperature associated with processors 302 stabilizes. Once the temperature in data processing system 300 stabilizes, management control unit 310 measures a first total processor power value $P_1$. Management control unit 310 then sets the current thermal threshold value $T_{thr\_c}$ to a high end of a range of potential thermal threshold values $T_{thr}$, for example, for a range of 65° C. to 80° C., management control unit 310 would set $T_{thr\_c}$ to 80° C. thereby forming $T_{thr2}$. Data processing system 300 then processes the current workload until the temperature associated with processors 302 stabilizes. Once the temperature in data processing system 300 stabilizes, management control unit 310 measures a second total processor power value $P_2$. Management control unit 310 then calculates the $P_{leak\_per\_°C.}$ scaling factor using the following $P_{leak\_per\_°C.}$ scaling factor equation:

$$P_{leak\_per\_°C.}=(P2-P1)/(T_{thr2}-T_{thr1}).$$

Thus, the $P_{leak\_per\_°C.}$ scaling factor may be, for example, ½ watt per degree Celsius, ⅜ watt per degree Celsius, ¼ watt per degree Celsius, or the like. Further, while the current example uses Celsius as the basis for temperature measurement, the illustrative embodiments are not limited to using only temperature measurements in Celsius. That is, any unit of measurement for temperature may be used, such as Fahrenheit, Kelvin, or the like.

Management control unit 310 derives the change in RPM as a function of temperature change $\Delta RPM/°C$. by, under the constant workload on processors 302, setting current thermal threshold value $T_{thr\_c}$ to a low end of a range of potential thermal threshold values $T_{thr}$, for example, for a range of 65° C. to 80° C., management control unit 310 would initially set $T_{thr\_c}$ to 65° C. thereby forming $T_{thr1}$. Data processing system 300 then processes the current workload until the temperature associated with processors 302 stabilizes. Once the temperature in data processing system 300 stabilizes, management control unit 310 measures a first fan speed in revolutions per minute $RPM_1$ via RPM sensors 307. Management control unit 310 then sets current thermal threshold value $T_{thr\_c}$ to a high end of a range of potential thermal threshold values $T_{thr}$, for example, for a range of 65° C. to 80° C., management control unit 310 would set $T_{thr\_c}$ to 80° C. thereby forming $T_{thr2}$. Data processing system 300 then processes the current workload until the temperature associated with processors 302 stabilizes. Once the temperature in data processing system 300 stabilizes, management control unit 310 measures a second fan speed in revolutions per minute $RPM_2$ via RPM sensors 307. Management control unit 310 then calculates the change in RPM as a function of temperature change $\Delta RPM/°C$. value using the following change in RPM equation:

$$\Delta RPM/°C.=(RPM_2-RPM_1)/(T_{thr2}-T_{thr1})$$

With the obtained and derived characteristic information, management control unit 310 is then able to determine an optimal thermal threshold and fan power setting that minimizes system power without performance penalty and with fast convergence at runtime. That is, at runtime, management control unit 310 retrieves a current thermal threshold value $T_{thr\_c}$ from thermal thresholds 320 that becomes the first thermal threshold under evaluation, a current total processor power value $P_{meas}$ for processors 302 via power sensors 304, a set of temperature values $T_{meas}$ read from thermal sensors 308 for processors 302, and an ambient temperature value $T_{amb}$ for data processing system 300.

Management control unit 310 uses the current total processor power value $P_{meas}$, a highest temperature value $T_{max}$ from the set of temperature values $T_{meas}$, the current thermal threshold value $T_{thr\_c}$, and the $P_{leak\_per\_°C.}$ scaling factor to calculate a total processor power value at the current thermal threshold value under consideration $P_{proc@Tthr\_c}$ using the following total processor power model equation:

$$P_{proc@Tthr\_c}=P_{meas}+(T_{thr\_c}-T_{max})*P_{leak\_per\_°C.}$$

With $P_{proc@Tthr\_c}$ determined, management control unit 310 determines a revolutions per minute value (RPM) required for a fan to reach the current thermal threshold value $T_{thr\_c}$. Management control unit 310 uses the previously calculated total processor power value at the current thermal threshold value $P_{proc@Tthr\_c}$, the current ambient temperature value $T_{amb}$ for data processing system 300, the current thermal threshold value $T_{thr\_c}$, and the change in RPM as a function of temperature change $\Delta RPM/°C$. value to determine an RPM value using the following RPM model equation:

$$RPM=((((P_{proc@Tthr\_c}/P_{proc\_char})*(T_{thr\_char}-T_{amb\_char}))+T_{amb})-T_{thr\_c})*\Delta RPM/°C.+RPM_{char}.$$

Based on the determined RPM value for the fan, management control unit 310 identifies a fan power value $P_{fan}$ using a lookup table or, if a lookup table for the particular fan is not available, deriving its own fan power table. That is, normally, there are known wattage ratings associated with each fan speed based on the manufacturing model of the fan installed in data processing system 300. Thus, management control unit 310 uses the determined RPM required for a fan to reach a desired temperature to identify in the lookup table what the fan power value $P_{fan}$ will be used at the determined RPM. However, in some instances lookup tables may not be available. Thus, management control unit 310 may derive a fan power model by initially setting the RPMs of a fan to a minimum rated RPM value for the fan and wait for the fan to reach the set RPM value. Once the fan reaches the set RPM value, management control unit 310 measures the power being consumed by the fan and stores the measured power value in a fan power table or other data structure. Management control unit 310 then increments the current RPM setting by an incremental value $\Delta RPM$ and determines whether the new RPM setting is greater than or equal to a maximum rated RPM value of the fan. If the new RPM setting is not greater than or equal to the maximum rated RPM value of the fan, then management control unit 310 sets the RPMs of a fan to the new RPM setting and waits for the fan to reach the set RPM value. Once the fan reaches the set RPM value, management control unit 310 again measures the power being consumed by the fan and stores the measure power value in the fan power table or other data structure, with the process repeating until the new RPM setting is greater than or equal to a maximum rated RPM value of the fan. If the incremental value is such that the fan power table does not comprise some power values for some RPM values, then management control unit 310 may use existing algorithms as a function of RPM to derive the unknown power values based upon other RPM and power values in the fan power table. Therefore, based on the determined RPM value for the fan, management control unit 310 may identify the fan power value $P_{fan}$ from the derived fan power table.

Management control unit 310 calculates an aggregate system power value $P_{total\_c}$ for the current thermal threshold value $T_{thr\_c}$ by summing the total processor power value $P_{proc\_@Tthr\_c}$ for the current time period with the identified fan power value $P_{fan}$. With the determined aggregate system power value $P_{total\_c}$ and without immediately changing the current thermal threshold value $T_{thr\_c}$, management control unit 310 performs a series of calculations to determines whether there is another thermal threshold $T_{thr\_i}$ that would lower overall aggregate system power. That is, for a range of potential thermal threshold values $T_{thr}$, for example, 65° C. to 80° C., management control unit 310 reruns each of the previous calculations to determine a potential aggregate system power value $P_{total\_i}$ using the current total processor power value $P_{meas}$ and a highest temperature value $T_{max}$ from the set of temperatures $T_{meas}$. Initially, management control unit 310 sets aggregate system power value $P_{total\_c}$ to a minimum aggregate system power value $P_{total\_min}$. Then, as each potential aggregate system power value $P_{total\_i}$ is calculated, management control unit 310 determines whether the potential aggregate system power value $P_{total\_i}$ is less than the minimum aggregate system power value $P_{total\_min}$.

If the potential aggregate system power value $P_{total\_i}$ associated with the potential thermal threshold value $T_{thr\_i}$ is not less than the minimum aggregate system power value $P_{total\_min}$, then management control unit 310 continues with calculating the next potential aggregate system power value $P_{total\_i}$ for the next potential thermal threshold value $T_{thr\_i}$ and determines whether the potential aggregate system power value $P_{total\_i}$ is less than the minimum aggregate system power value $P_{total\_min}$. If the potential aggregate system power value $P_{total\_i}$ is less than the minimum aggregate system power value $P_{total\_min}$, then management control unit 310 sets the potential aggregate system power value $P_{total\_i}$ as the new minimum aggregate system power value $P_{total\_min}$ and stores the potential thermal threshold value $T_{thr\_i}$ as the current optimal thermal threshold value $T_{thr\_o}$ that lowers the overall aggregate system power even though all of the potential thermal threshold values $T_{thr}$ have not been checked.

The process continues until all of the potential thermal threshold values $T_{thr}$ have been checked. Once all the potential thermal threshold values $T_{thr}$ have been checked, management control unit 310 updates the current thermal threshold value $T_{thr\_c}$ thermal thresholds 320 to the current optimal thermal threshold value $T_{thr\_o}$ that lowers the overall aggregate system power. By updating the current thermal threshold value $T_{thr\_c}$, the fan speed(s) may increase, decrease, or stay the same. Management control unit 310 then waits a predetermined time period to ensure that the fan has reached a constant speed. Once the predetermined time period has expired, management control unit 310 repeats the process by retrieving a current high thermal threshold value $T_{thr}$ from thermal thresholds 320, obtaining a current total processor power value $P_{meas}$ for processors 302 via power sensors 304, obtaining a current set of temperature values $T_{meas}$ read from thermal sensors 308 for processors 302, and a current ambient temperature value $T_{amb}$ for data processing system 300.

Management control unit 310 may be applied for both system power and thermal management for each critical component (or subsystem on a chip, as with multi-core processors) so that management control system 310 may directly target the thermal and system power boundaries and hold to them. While management control unit 310 is shown to use values from power sensors 304, utilization sensors 306, and thermal sensors 308 to control fan speed adjuster 318, the illustrative embodiments recognize that any type of sensor may provide values to management control unit 310 and management control unit 310 may use any type of adjuster to mitigate the effects of delamination of organic packages in a data processing system due to thermal stress while allowing as much system power as possible to be saved in the data processing system, such as using voltage adjuster 312, frequency adjuster 314, and/or throttle adjuster 316.

Figure 4A:
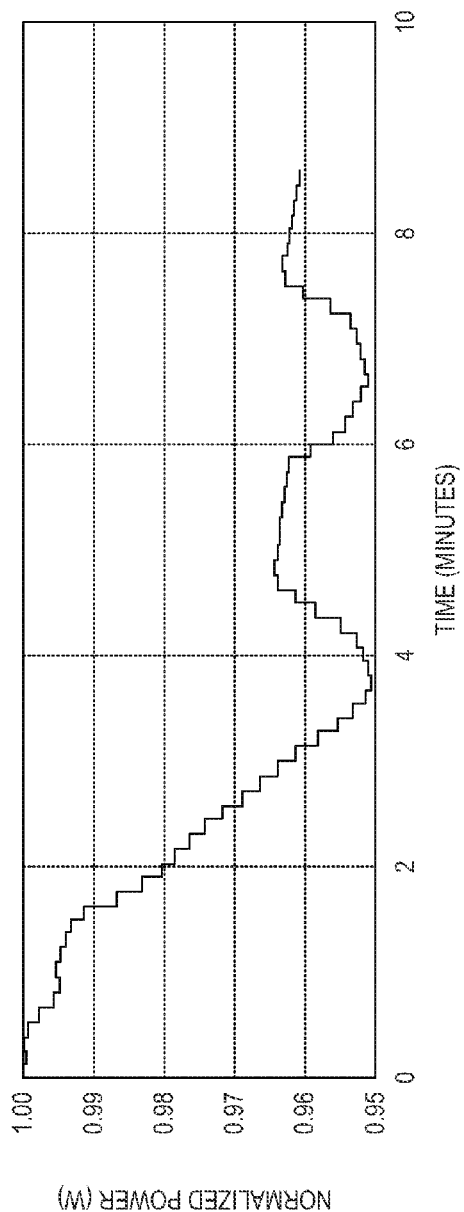
FIGS. 4A and 4B depict exemplary graphs illustrating a comparison of a time required to reach convergence of system power in a prior art system versus the previously described system in accordance with an illustrative embodiment.
Figure 4B:
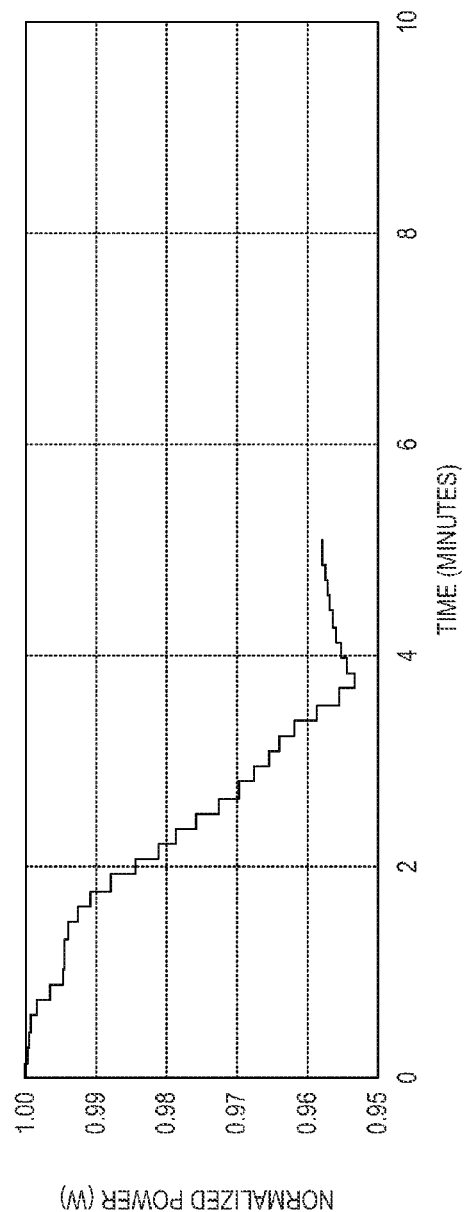

FIGS. 4A and 4B depict exemplary graphs illustrating a comparison of a time required to reach convergence of system power in a prior art system versus the previously described system in accordance with an illustrative embodiment. FIG. 4A depicts a graph of a prior art system where the time to reach convergence and normalize power is almost 9 minutes. In comparison, FIG. 4B depicts a graph of the illustrative system where the time to reach convergence and normalize power is only 4.5 minutes.

Figure 5A:
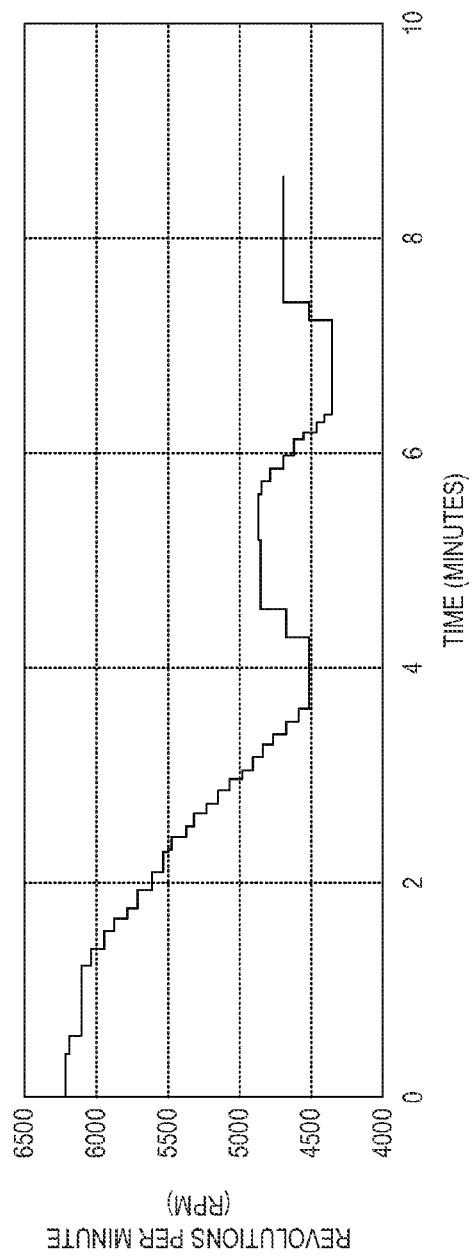
FIGS. 5A and 5B depict exemplary graphs illustrating a comparison of a time required to reach convergence of fan speed in a prior art system versus the previously described system in accordance with an illustrative embodiment.
Figure 5B:
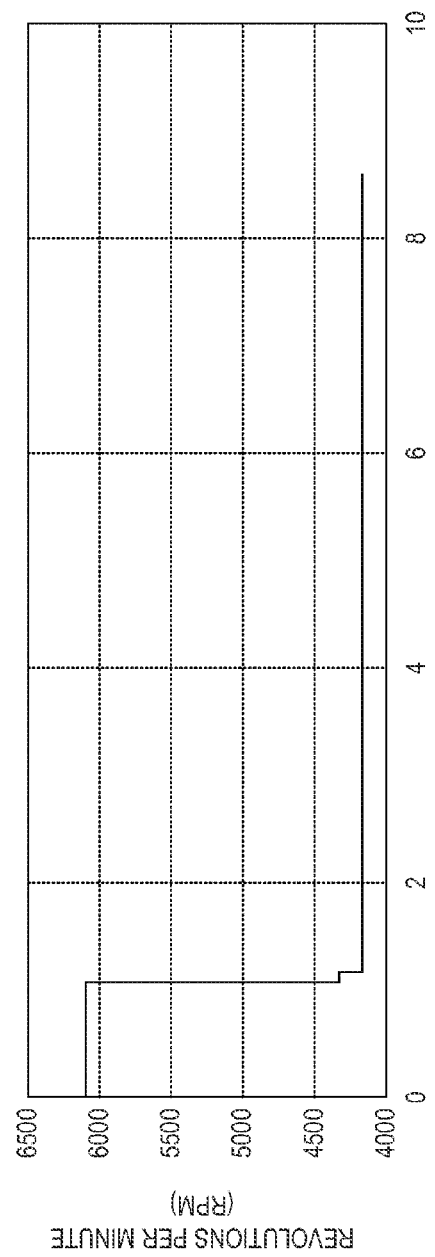

FIGS. 5A and 5B depict exemplary graphs illustrating a comparison of a time required to reach convergence of fan speed in a prior art system versus the previously described system in accordance with an illustrative embodiment. FIG. 5A depicts a graph of a prior art system where the time to reach convergence and normalize fan speed is almost 8 minutes. In comparison, FIG. 5B depicts a graph of the illustrative system where the time to reach convergence and normalize fan speed is 1 minute.

Thus, the illustrative embodiments provide for a fast convergence of more than twice that in prior art systems. Once the thermal conditions within a data processing system are stabilized using the illustrative embodiment, the data processing system is operating at the minimum aggregate power when combining fan power and leakage power in the processors. The models of the illustrative embodiments are derived from system characterization, which may be slightly suboptimal when compared to actual fan speed measurements. However, using model-based characterizations lead to a practical solution that may be realized in an environment with dynamic workloads and within the thermal response times of packaging within the data processing system.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart, and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
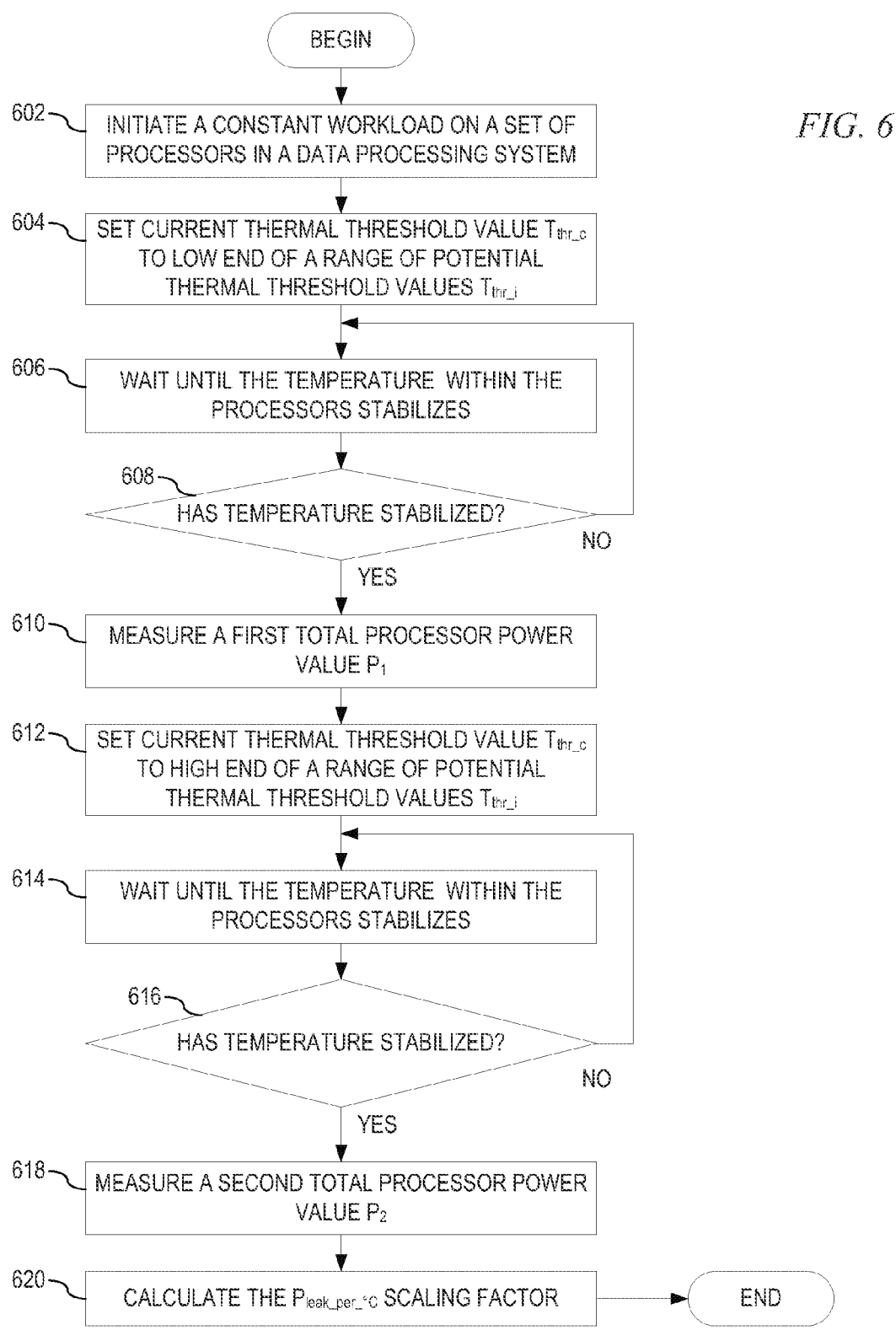
FIG. 6 depicts a flowchart outlining exemplary operations for deriving a power leakage scaling factor $P_{leak\_per\_^\circ C.}$ in accordance with an illustrative embodiment.

FIG. 6 depicts a flowchart outlining exemplary operations for deriving a power leakage scaling factor $P_{leak\_per\_^\circ C.}$ in accordance with an illustrative embodiment. As the operation begins, a management control unit initiates a constant workload on a set of processors in a data processing system (step 602). The management control unit sets a current thermal threshold value $T_{thr\_c}$ from a store of thermal thresholds to a low end of a range of potential thermal threshold values $T_{thr\_i}$ (step 604). For example, for a range of 65° C. to 80° C., the management control unit would initially set $T_{thr\_c}$ to 65° C. thereby forming $T_{thr1}$. The data processing system then processes the current workload until the temperature associated with the processors stabilizes (step 606). The management control unit determines whether the temperature has stabilized by monitoring the ambient temperature of the data processing system via a thermal sensor (step 608). If at step 608 the temperature of the data processing system has not stabilized, then the operation returns to step 606. If at step 608 the temperature of the data processing system has stabilized, the management control unit measures a first total processor power value $P_1$ (step 610).

The management control unit then sets the current thermal threshold value $T_{thr\_c}$ to a high end of a range of potential thermal threshold values $T_{thr\_i}$ (step 612). For example, for a range of 65° C. to 80° C., the management control unit would set $T_{thr}$ to 80° C. thereby forming $T_{thr2}$. The data processing system then processes the current workload until the temperature associated with the processors stabilizes (step 614). The management control unit determines whether the temperature has stabilized by monitoring the ambient temperature of the data processing system via a thermal sensor (step 616). If at step 616 the temperature of the data processing system has not stabilized, then the operation returns to step 614. If at step 616 the temperature of the data processing system has stabilized, the management control unit measures a second total processor power value $P_2$ (step 618). The management control unit then calculates the $P_{leak\_per\_^\circ C.}$ scaling factor (step 620) using the following $P_{leak\_per\_^\circ C.}$ scaling factor equation:

$$P_{leak\_per\_^\circ C.}=(P2-P1)/(T_{thr2}-T_{thr1}).$$

The $P_{leak\_per\_^\circ C.}$ scaling factor may be, for example, ½ watt per degree Celsius, ⅜ watt per degree Celsius, ¼ watt per degree Celsius, or the like. Further, while the current example uses Celsius as the basis for temperature measurement, the illustrative embodiments are not limited to using only temperature measurements in Celsius. That is, any unit of measurement for temperature may be used, such as Fahrenheit, Kelvin, or the like. After step 620 the operation ends.

Figure 7:
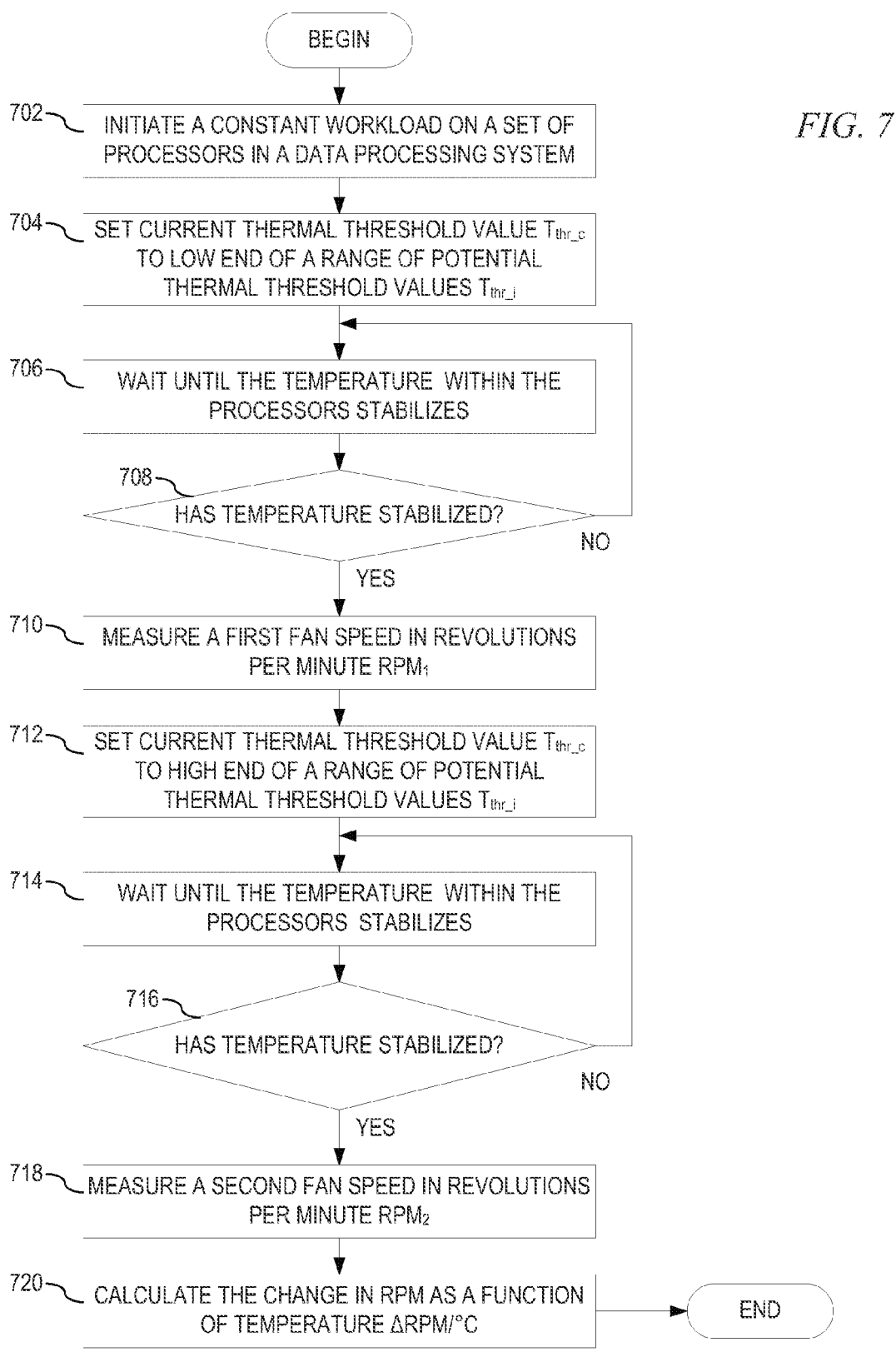
FIG. 7 depicts a flowchart outlining exemplary operations for deriving change in RPM as a function of temperature change $\Delta RPM/^\circ C.$ in accordance with an illustrative embodiment.

FIG. 7 depicts a flowchart outlining exemplary operations for deriving change in RPM as a function of temperature change $\Delta RPM/^\circ C.$ in accordance with an illustrative embodiment. As the operation begins, a management control unit initiates a constant workload on a set of processors in a data processing system (step 702). The management control unit sets a current thermal threshold value $T_{thr\_c}$ from a store of thermal thresholds to a low end of a range of potential thermal threshold values $T_{thr\_i}$ (step 704). For example, for a range of 65° C. to 80° C., the management control unit would initially set $T_{thr\_c}$ to 65° C. thereby forming $T_{thr1}$. The data processing system then processes the current workload until the temperature associated with the processors stabilizes (step 706). The management control unit determines whether the temperature has stabilized by monitoring the ambient temperature of the data processing system via a thermal sensor (step 708). If at step 708 the temperature of the data processing system has not stabilized, then the operation returns to step 706. If at step 708 the temperature of the data processing system has stabilized, the management control unit measures a first fan speed in revolutions per minute $RPM_1$ via a set of RPM sensors (step 710).

The management control unit then sets the current thermal threshold value $T_{thr\_c}$ to a high end of a range of potential thermal threshold values $T_{thr\_i}$ (step 712). For example, for a range of 65° C. to 80° C., the management control unit would set $T_{thr}$ to 80° C. thereby forming $T_{thr2}$. The data processing system then processes the current workload until the temperature associated with the processors stabilizes (step 714). The management control unit determines whether the temperature has stabilized by monitoring the ambient temperature of the data processing system via a thermal sensor (step 716). If at step 716 the temperature of the data processing system has not stabilized, then the operation returns to step 714. If at step 716 the temperature of the data processing system has stabilized, the management control unit measures a second fan speed in revolutions per minute $RPM_2$ via the set of RPM sensors (step 718). The management control unit then calculates the change in RPM as a function of temperature change $\Delta RPM/°C$. value (step 720) using the following change in RPM equation:

$$\Delta RPM/°C.=(RPM_2-RPM_1)/(T_{thr2}-T_{thr1}).$$

After step 720 the operation ends.

Figure 8:
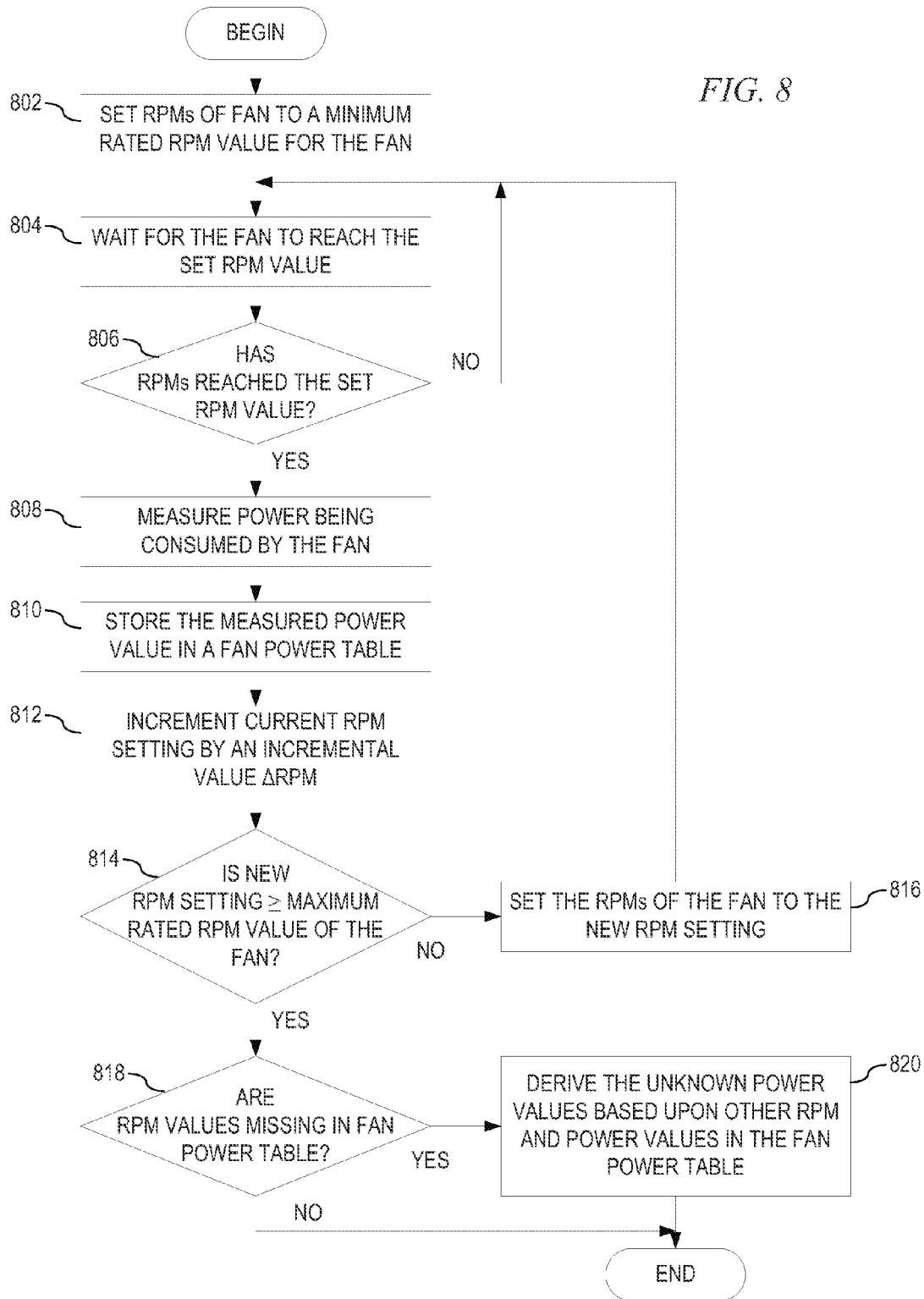
FIG. 8 depicts a flowchart outlining exemplary operations for deriving a fan power model in accordance with an illustrative embodiment.

FIG. 8 depicts a flowchart outlining exemplary operations for deriving a fan power model in accordance with an illustrative embodiment. As the operation begins, the management control unit initially sets the revolutions per minute (RPMs) of a cooling fan to a minimum rated RPM value for the fan (step 802). The management control unit then waits for the fan to reach the set RPM value (step 804). The management control unit determines whether the RPMs of the fan have reached the set RPM value as measured via an RPM sensor (step 806). If at step 806 the RPMs of the fan have not reached the RPM value, then the operation returns to step 804. If at step 806 the RPMs of the fan have reached the set RPM value, then the management control unit measures the power being consumed by the fan (step 808) and stores the measured power value in a fan power table or other data structure (step 810). The management control unit then increments the current RPM setting by an incremental value $\Delta RPM$ (step 812). The management control unit determines whether the new RPM setting is greater than or equal to a maximum rated RPM value of the fan (step 814) If at step 814 the new RPM setting is not greater than or equal to the maximum rated RPM value of the fan, then the management control unit sets the RPMs of a fan to the new RPM setting (step 816), with the operation returning to step 804 thereafter. If at step 814 the new RPM setting is greater than or equal to the maximum rated RPM value of the fan, the management control unit determines whether there are any RPM values in the fan power table or other structure that are missing (step 818). If at step 818 there are any missing RPM values, the management control unit may use an existing algorithms as a function of RPM to derive the unknown power values based upon other RPM and power values in the fan power table (step 820), with the operation ending thereafter. If at step 818, there are no missing RPM values, the operation ends.

Figure 9:
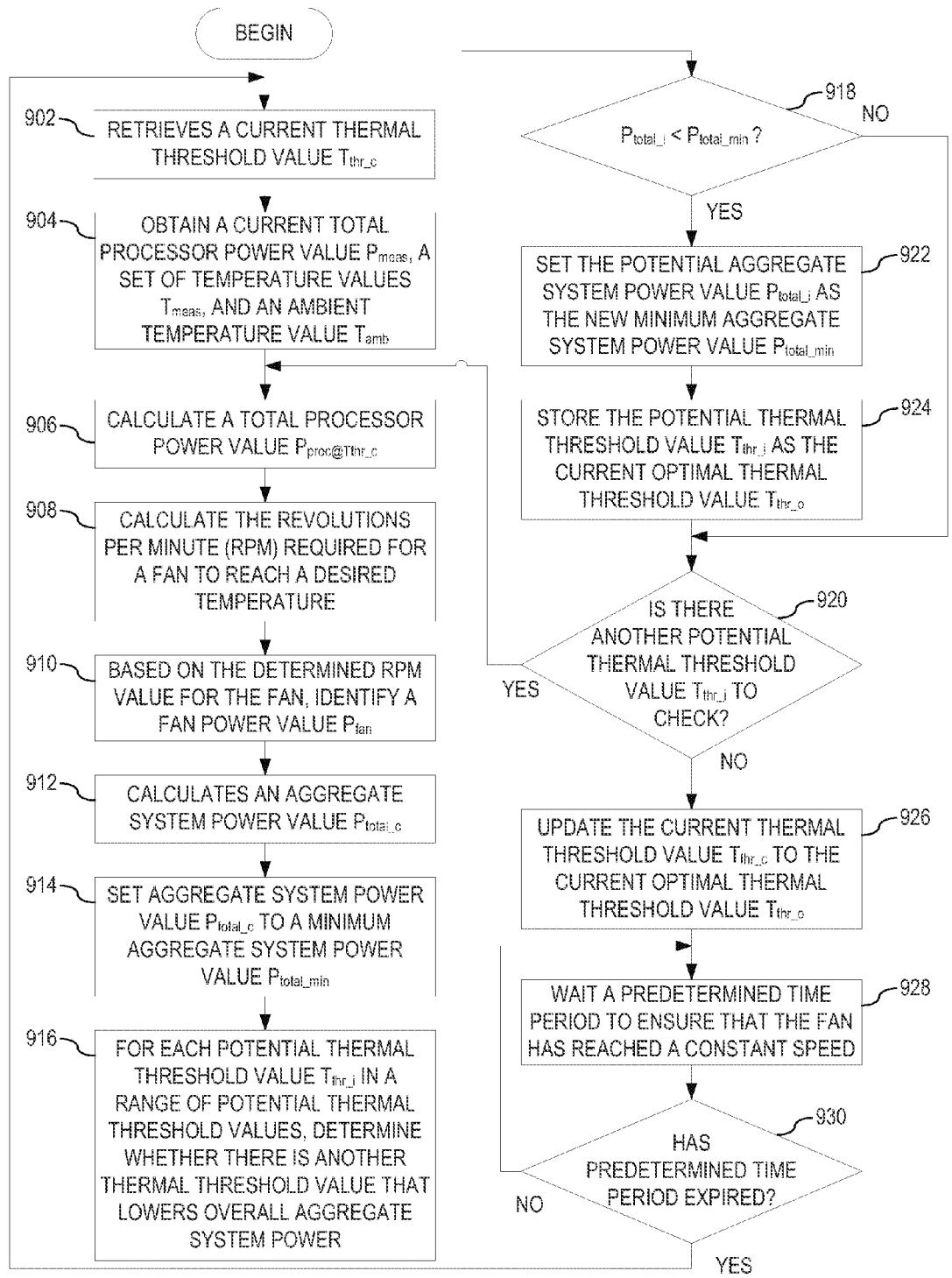
FIG. 9 depicts a flowchart outlining exemplary operations for minimizing system power in a data processing system without performance penalty and with fast convergence at runtime in accordance with an illustrative embodiment.

FIG. 9 depicts a flowchart outlining exemplary operations for minimizing system power in a data processing system without performance penalty and with fast convergence at runtime in accordance with an illustrative embodiment. As the operation begins, the management control unit retrieves a current thermal threshold value $T_{thr\_c}$ (step 902). The management control unit obtains a current total processor power value $P_{meas}$ for processors via power sensors, a set of temperature values $T_{meas}$ read from thermal sensors for processors, and an ambient temperature value $T_{amb}$ for the data processing system (step 904). The management control unit uses the current total processor power value $_{Pmeas}$, a highest temperature value $_{Tmax}$ from the set of temperature values $_{Tmeas}$, the current thermal threshold value $_{Tthr\_c}$, and the $_{Pleak\_per\_°C.}$ scaling factor to calculate a total processor power value at the current thermal threshold value under consideration $P_{proc@Tthr\_c}$ (step 906) using the following total processor power model equation:

$$P_{proc@Tthr\_c}=P_{meas}+(T_{thr\_c}-T_{max})*P_{leak\_per\_°C.}$$

With $P_{proc@Tthr\_c}$ determined, the management control unit determines a revolutions per minute value (RPM) required for a fan to reach the current thermal threshold value $T_{thr\_c}$ (step 908) by using the previously calculated total processor power value at the current thermal threshold value $P_{pro@Tthr\_c}$, the current ambient temperature value $T_{amb}$ for data processing system 300, the current thermal threshold value $T_{thr\_c}$, and the change in RPM as a function of temperature change $\Delta RPM/°C.$ value to determine an RPM value using the following RPM model equation:

$$RPM=((((P_{proc@Tthr\_c}/P_{proc\_char})*(T_{thr\_char}-T_{amb\_char}))+T_{amb})-T_{thr\_c})*\Delta RPM/°C.+RPM_{char}.$$

Based on the determined RPM value for the fan, the management control unit identifies a fan power value $P_{fan}$ using a lookup table or a derived fan power table (step 910). The management control unit then calculates an aggregate system power value $P_{total\_c}$ for the current thermal threshold value $T_{thr\_c}$ by summing the total processor power value $P_{proc\_@Tthr\_c}$ for the current time period with the identified fan power value $P_{fan}$ (step 912). The management control unit sets aggregate system power value $P_{total\_c}$ to a minimum aggregate system power value $P_{total\_min}$ (step 914). For each potential thermal threshold value $T_{thr\_i}$ in a range of potential thermal threshold values, the management control unit performs a series of calculations to determine whether there is another thermal threshold that would lower overall aggregate system power (step 916). As each potential aggregate system power value $P_{total\_i}$ is calculated, the management control unit determines whether the potential aggregate system power value $P_{total\_i}$ is less than the minimum aggregate system power value $P_{total\_min}$ (step 918).

If at step 918 the potential aggregate system power value $P_{total\_i}$ associated with the potential thermal threshold value $T_{thr\_i}$ is not less than the minimum aggregate system power value $P_{total\_min}$, then the management control unit determines whether there is another potential thermal threshold value $T_{thr\_i}$ in the range of potential thermal threshold values $T_{thr\_i}$ (step 920). If at step 920 there is another potential thermal threshold value $T_{thr\_i}$, then the operation returns to step 906.

If at step 918 the potential aggregate system power value $P_{total\_i}$ is less than the minimum aggregate system power value $P_{total\_min}$, then the management control unit sets the potential aggregate system power value $P_{total\_i}$ as the new minimum aggregate system power value $P_{total\_min}$ (step 922). The management control unit then stores the potential thermal threshold value $T_{thr\_i}$ as the current optimal thermal threshold value $T_{thr\_o}$ that lowers the overall aggregate system power (step 924). The operation then proceeds to step 920 thereafter. If at step 920 there is not another potential thermal threshold value $T_{thr\_i}$, then the management control unit updates the current thermal threshold value $T_{thr\_c}$ to the current optimal thermal threshold value $T_{thr\_o}$ that lowers the overall aggregate system power (step 926). By updating the current thermal threshold value $T_{thr\_c}$ the fan speed(s) may increase, decrease, or stay the same. Then the management control unit waits a predetermined time period to ensure that the fan has reached a constant speed (step 928). The management control unit determines whether the predetermined time period has expired (step 930). If at step 930 the predetermined time period has not expired, then the operation returns to step 928. If at step 930 the predetermined time period has expired, then the operation returns to step 902.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a mechanism for minimizing system power without performance penalty with fast convergence. The mechanism adjusts a fan speed based on a processor thermal set point from which system power is minimized without thermal violations using a model-based approach. Using models for processor power and revolutions per minute (RPM) required for a fan to reach a desired temperature, the mechanism determines an aggregate system power value $P_{total}$ of system power and cooling fan power for a predetermined time period. In order to reach a point where leakage power increase does not outrun fan power savings, then, during each time period, the mechanism determines whether a new thermal threshold for the system should be implemented based initially on the determined aggregate system power value $P_{total}$. If the mechanism determines a new thermal threshold that provides better overall power efficiency than a current thermal threshold, then the mechanism updates the thermal threshold. Further, if there is a new thermal threshold that reduces overall the aggregate system power, then the fan speed is adjusted accordingly based on the on the reduced aggregate system power value $P_{total}$. Thus, the illustrative embodiments minimize system power by exploiting that relationship between fan power and leakage power, and reach optimal aggregate system power faster.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:

determine a current aggregate system power value using a current thermal threshold value, wherein the computer readable program to determine the current aggregate system power further causes the computing device to:
calculate a total processor power value;
calculate a revolutions per minute required for a fan to reach the cu ent thermal threshold value;
using the revolutions per minute value, identify a fan power value; and
calculate the current aggregate system power value by summing the total processor power value with the fan power value;

for each potential thermal threshold value in a set of potential thermal threshold values, determine whether there is a potential thermal threshold value that results in a potential aggregate system power value that is lower than the current aggregate system power value; and responsive to identifying an optimal potential thermal threshold value from the set of potential thermal threshold values that results in minimum aggregate system power value that is lower than the current aggregate system power value, set the optimal potential thermal threshold value as a new thermal threshold value, wherein by setting the optimal potential thermal threshold value that results in minimum aggregate system power as the new thermal threshold value for a current time period, a fan speed of the fan coupled to the computing device either increases, decreases, or stays the same.

2. The computer program product of claim 1, wherein the computer readable program calculates the total processor power value using a total processor power model equation that is:

$$P_{proc@Tthr\_c} = P_{meas} + (T_{thr\_c} - T_{max}) * P_{leak\_per\_°C.}$$

where $P_{proc@Tthr\_c}$ is a total processor power value at the current thermal threshold under consideration, $P_{meas}$ is a current total processor power, $T_{max}$ is a highest temperature associated with the set of temperatures T obtained for a set of processors in the data processing system, $T_{thr\_c}$ is the current thermal threshold, and $P_{leak\_per\_°C.}$ is a scaling factor for leakage power in terms of temperature in degrees Celsius.

3. The computer program product of claim 1, wherein the computer readable program calculates the revolutions per minute required for the fan to reach the current thermal threshold value using a revolutions per minute (RPM) model equation that is:

$$RPM = ((((P_{proc@Tthr\_c}/P_{proc\_char})*(T_{thr\_char}-T_{amb\_char}))+T_{amb})-T_{thr\_c})*\Delta RPM/°C. + RPM_{char}$$

where $P_{proc@Tthr\_c}$ is a total processor power at the thermal threshold under consideration, $P_{proc\_char}$ is characteristic processor power value obtained for a set of processors in the data processing system during calibration of the data processing system, $T_{thr\_char}$ is a characteristic temperature value obtained for the set of processors in the data processing system during calibration of the data processing system, $T_{thr\_amb}$ is a characteristic ambient temperature value obtained for the data processing system during calibration of the data processing system, $T_{amb}$ is the current ambient temperature of the data processing system, $T_{thr\_c}$ is the current thermal threshold under consideration, $\Delta RPM/°C.$ is a change in RPM as a function of temperature change, and $RPM_{char}$ is characteristic RPM value obtained for the data processing system during calibration of the data processing system.

4. The computer program product of claim 1, wherein the computer readable program identifies the fan power value using the revolutions per minute in a lookup table that associates revolutions per minute to fan power based on the manufacturing model of the fan.

5. The computer program product of claim 1, wherein the computer readable program identifies the fan power value using the revolutions per minute in a derived fan table.

6. The computer program product of claim 1, wherein the computer readable program determines whether there is the potential thermal threshold that results in potential aggregate system power that is lower than the current aggregate system power by further causing the computing device to:
set the current aggregate system power value to a minimum aggregate system power value;
for a first potential thermal threshold value in the set of potential thermal threshold values, determine a first potential aggregate system power value using the first potential thermal threshold value;
determine whether the first potential aggregate system power value is less than the minimum aggregate system power value;
responsive to the first potential aggregate system power value being less than the minimum aggregate system power value, set the minimum aggregate system power value to the first potential aggregate system power value;
store as the optimal potential thermal threshold value;
responsive to the first potential aggregate system power value being greater than or equal to the minimum aggregate system power value, leave the minimum aggregate system power value as it is; and
repeat the process for each subsequent potential thermal threshold value in the set of potential thermal threshold values.

7. An apparatus, comprising:
a processor; and
a memory coupled to the processor, wherein the memory comprises instructions which, when executed by the processor, cause the processor to:
determine a current aggregate system power value using a current thermal threshold value, wherein the instructions to determine the current aggregate system power further cause the processor to:
calculate a total processor power value;
calculate a revolutions per minute required for a fan to reach the current thermal threshold value;
using the revolutions per minute value, identify a fan power value; and
calculate the current aggregate system power value by summing the total processor power value with the fan power value;
for each potential thermal threshold value in a set of potential thermal threshold values, determine whether there is a potential thermal threshold value that results in a potential aggregate system power value that is lower than the current aggregate system power value; and
responsive to identifying an optimal potential thermal threshold value from the set of potential thermal threshold values that results in minimum aggregate system power value that is lower than the current aggregate system power value, set the optimal potential thermal threshold value as a new thermal threshold value, wherein by setting the optimal potential thermal threshold value that results in minimum aggregate system power as the new thermal threshold value for a current time period, a fan speed of the fan coupled to the apparatus either increases, decreases, or stays the same.

8. The apparatus of claim 7, wherein the instructions calculate the total processor power value using a total processor power model equation that is:

$$P_{proc@Tthr\_c} = P_{meas} + (T_{thr\_c} - T_{max})*P_{leak\_per\_°C.}$$

where $P_{proc@Tthr\_c}$ is a total processor power value at the current thermal threshold under consideration, $P_{meas}$ is a current total processor power, $T_{max}$ is a highest temperature associated with the set of temperatures T obtained for a set of processors in the data processing system, $T_{thr\_c}$ is the current thermal threshold, and $P_{leak\_per\_°C.}$ is a scaling factor for leakage power in terms of temperature in degrees Celsius.

9. The apparatus of claim 7, wherein the instructions calculate the revolutions per minute required for the fan to reach the current thermal threshold value using a revolutions per minute (RPM) model equation that is:

$$RPM = ((((P_{proc@Tthr\_c}/P_{proc\_char})*(T_{thr\_char}-T_{amb\_char}))+T_{amb})-T_{thr\_c})*\Delta RPM/°C. + RPM_{char}$$

where $P_{proc@Tthr\_c}$ is a total processor power at the thermal threshold under consideration, $P_{proc\_char}$ is characteristic processor power value obtained for a set of processors in the data processing system during calibration of the data processing system, $T_{thr\_char}$ is a characteristic temperature value obtained for the set of processors in the data processing system during calibration of the data processing system, $T_{thr\_amb}$ is a characteristic ambient temperature value obtained for the data processing system during calibration of the data processing system, $T_{amb}$ is the current ambient temperature of the data processing system, $T_{thr\_c}$ is the current thermal threshold under consideration, $\Delta RPM/°C.$ is a change in RPM as a function of temperature change, and $RPM_{char}$ is characteristic RPM value obtained for the data processing system during calibration of the data processing system.

10. The apparatus of claim 7, wherein the instructions identify the fan power value using the revolutions per minute in a lookup table that associates revolutions per minute to fan power based on the manufacturing model of the fan.

11. The apparatus of claim 7, wherein the instructions identify the fan power value using the revolutions per minute in a derived fan table.

12. The apparatus of claim 7, wherein the instructions determine whether there is the potential thermal threshold that results in potential aggregate system power that is lower than the current aggregate system power by further causing the processor to:
- set the current aggregate system power value to a minimum aggregate system power value;
- for a first potential thermal threshold value in the set of potential thermal threshold values, determine a first potential aggregate system power value using the first potential thermal threshold value;
- determine whether the first potential aggregate system power value is less than the minimum aggregate system power value;
- responsive to the first potential aggregate system power value being less than the minimum aggregate system power value, set the minimum aggregate system power value to the first potential aggregate system power value;
- store as the optimal potential thermal threshold value;
- responsive to the first potential aggregate system power value being greater than or equal to the minimum aggregate system power value, leave the minimum aggregate system power value as it is; and
- repeat the process for each subsequent potential thermal threshold value in the set of potential thermal threshold values.

* * * * *